J. McMULLIN.
Fruit-Tongs.

No. 221,842. Patented Nov. 18, 1879.

WITNESSES:
Henry N. Miller
C. Sedgwick

INVENTOR:
J. McMullin
BY Munn & Co
ATTORNEYS.

UNITED STATES PATENT OFFICE.

JOSEPH McMULLIN, OF CASEY P. O., IOWA.

IMPROVEMENT IN FRUIT-TONGS.

Specification forming part of Letters Patent No. 221,842, dated November 18, 1879; application filed August 5, 1879.

*To all whom it may concern:*

Be it known that I, JOSEPH MCMULLIN, of Casey P.O., in the county of Guthrie and State of Iowa, (residence in Adair county, Iowa,) have invented a new and useful Improvement in Fruit-Tongs, of which the following is a specification.

My invention relates to implements for drawing dried fruits, sugar, and other materials from barrels; and the invention consists in two bars formed with claw-shaped ends and pivoted together crosswise. The straight portions of the bars serve as handles, whereby the claw ends may be spread and then brought together, to pierce and separate the material. The points of the claws are of peculiar shape, by which they clear themselves when spread for dropping the fruit.

Figure 1:
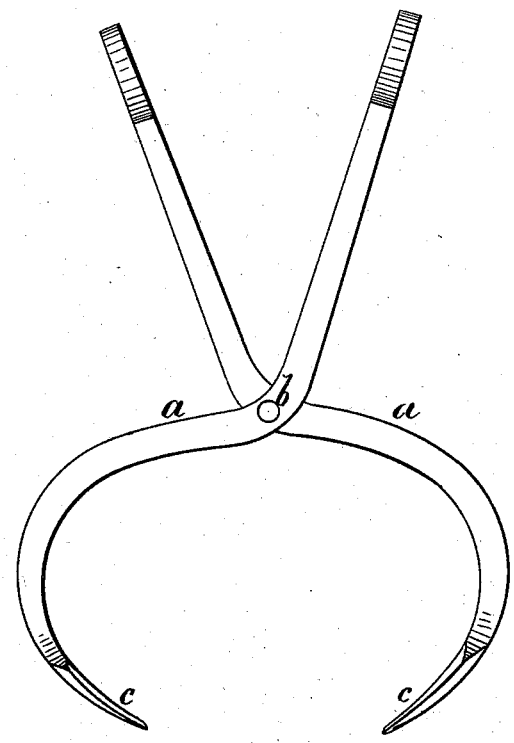
Figure 2:
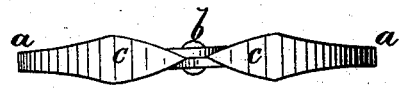

The invention will be described more particularly with reference to the accompanying drawings, wherein Figure 1 is a side view of the tongs. Fig. 2 is an end view of the same.

Similar letters of reference indicate corresponding parts.

The improved tongs A consist of metal claw-bars *a*, crossed, and held together by a pivot screw or pin, *b*, on which they swing. The bars *a* are alike, and are each formed with a straight or handle portion and with a curved and pointed claw end, the bars being connected so that the ends curve toward each other, with the points nearly touching, when the implement is closed. The points *c* are made in the form of flattened barbs, with knife-edges, so that they enter the fruit or other material readily by moderate pressure, and the material will not adhere when the tongs are opened to free it.

In use the claw ends are spread by opening the handles, and the points being then placed on the fruit, by bringing the handles together the barbed ends cut their way, and the mass inclosed by the claws may be then separated and raised.

The handles are to be long enough to obtain the required power, and may be formed with a ring at the outer end, or fitted with a wooden sleeve.

To facilitate raising the material the tongs may be formed with four prongs, two on each handle.

Having thus fully described my invention, I claim as new and desire to secure by Letters Patent—

The improved fruit-tongs A, consisting of the pivoted claw-bars *a*, that are formed with the flat barb-shaped ends *c*, as and for the purposes set forth.

JOSEPH McMULLIN.

Witnesses:
J. W. RUTT,
JAMES M. SAYERS.